Figure 8:
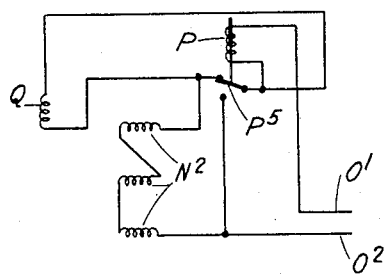

May 21, 1929.  R. W. BILES  1,714,071
PROTECTIVE APPARATUS FOR ALTERNATING CURRENT ELECTRIC CIRCUITS
Filed June 23, 1926  3 Sheets-Sheet 1
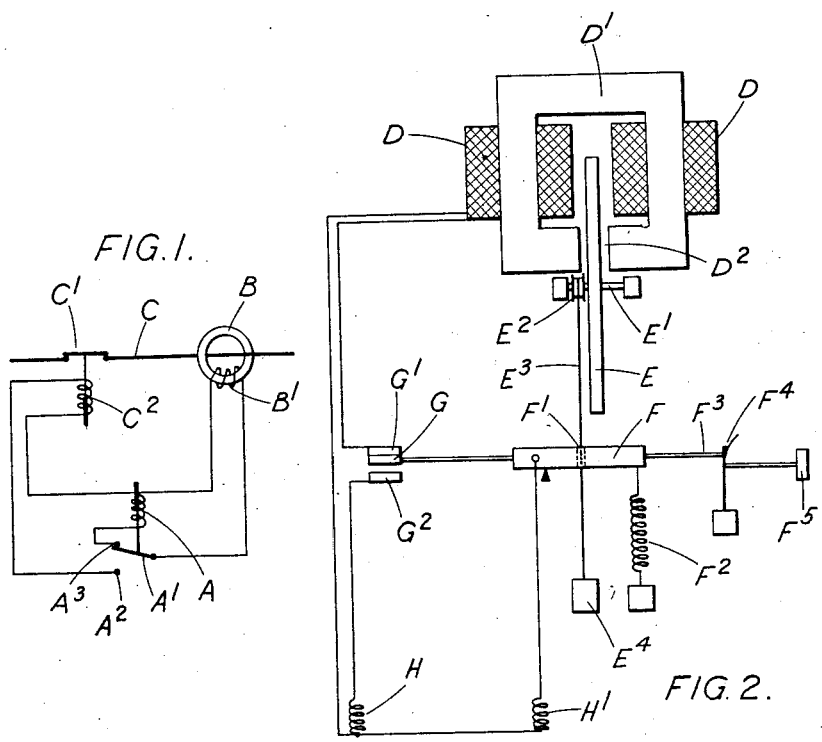
FIG.1.
FIG.2.
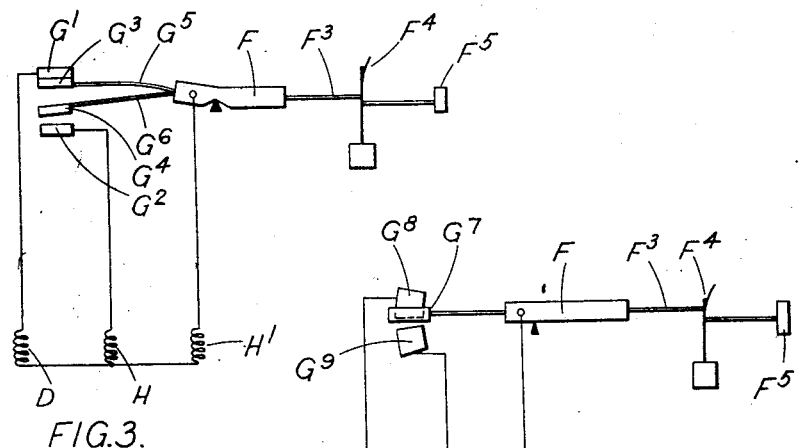
FIG.3.
FIG.4.
INVENTOR
Reginald W. Biles,
BY Watson, Coit, Morse & Grindle
ATTYS.

May 21, 1929.　　　　R. W. BILES　　　　1,714,071
PROTECTIVE APPARATUS FOR ALTERNATING CURRENT ELECTRIC CIRCUITS
Filed June 23, 1926　　　3 Sheets-Sheet 2
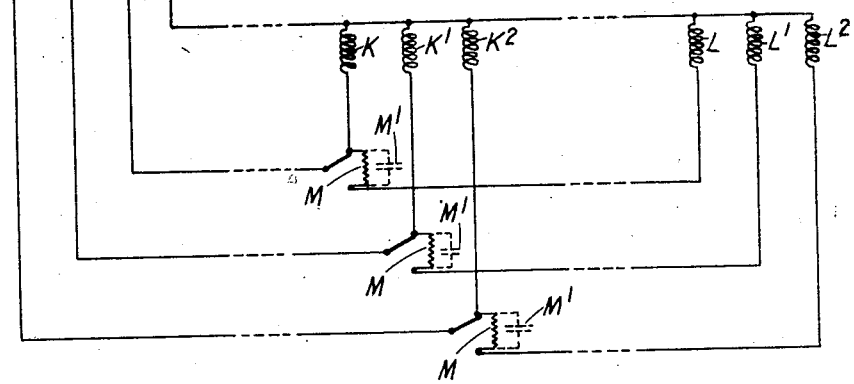
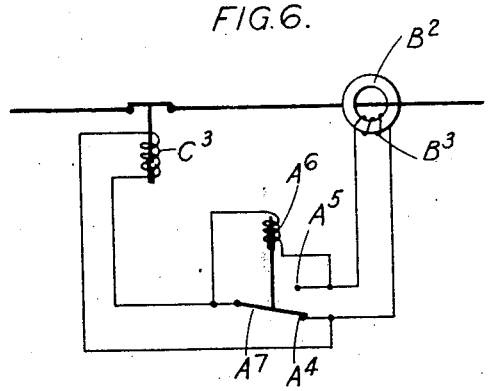
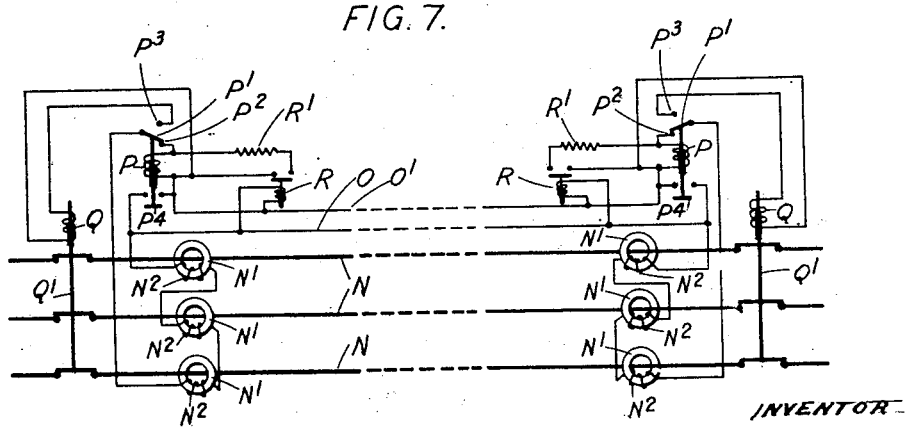

May 21, 1929.    R. W. BILES    1,714,071

PROTECTIVE APPARATUS FOR ALTERNATING CURRENT ELECTRIC CIRCUITS

Filed June 23, 1926    3 Sheets-Sheet 3

INVENTOR
Reginald W. Biles,
BY Watson, Coit, Morse & Grindle,
ATTYS.

Patented May 21, 1929.

1,714,071

UNITED STATES PATENT OFFICE.

REGINALD WILLIAM BILES, OF BALCOMBE, ENGLAND, ASSIGNOR TO A. REYROLLE & COMPANY LIMITED, OF HEBBURN-ON-TYNE, ENGLAND, A COMPANY OF GREAT BRITAIN.

PROTECTIVE APPARATUS FOR ALTERNATING-CURRENT ELECTRIC CIRCUITS.

Application filed June 23, 1926, Serial No. 118,076, and in Great Britain July 4, 1925.

This invention relates to protective apparatus for alternating current electric circuits and has particular reference to protective arrangements of the type wherein tripping circuits are operated by the secondary windings of current transformers through the action of relays.

Such operation is often indirect, i. e. the secondary winding energizes a relay, for instance an over-load relay, and the relay controls a local circuit including the tripping coil and a battery or some source of power. Direct tripping, i. e. the energizing of the tripping coil direct from the secondary winding, is also employed in some cases and the use of a local battery is thus obviated. Such an arrangement, however, entails a permanent load on the current transformer which in many cases is undesirable. Further, it is not easy in such a case to provide for a definite time-delay action.

Thus one object of the present invention is to provide for direct tripping without imposing a permanent heavy load on the current transformer, whereby the necessity for local batteries or other auxiliary sources of power is avoided.

A further object of the invention is so to arrange the protective apparatus as to enable an inverse or other time-delay to be provided for.

Although primarily intended to give direct tripping on over-load, the invention is also applicable to protective systems for feeders or other electrical circuits, in which the secondaries of protective current transformers at the two ends of the feeder are connected together by a pilot circuit.

Another object of the invention is thus to provide a satisfactory pilot wire protective system wherein power derived from the protective current transformers can be utilized to energize the tripping coils.

Still further objects of the invention will be apparent from the following description of the accompanying drawings and from the appended claims.

In these drawings, which illustrate diagrammatically by way of example some alternative arrangements according to the invention, Figure 1 shows a simple arrangement for overload protection, Figure 2 illustrates a convenient construction of overload relay, Figures 3 and 4 show modifications in the arrangement of contacts for the relay shown in Figure 2, Figure 5 illustrates the application of the invention to overload protection in a three-phase circuit, Figure 6 shows a modification of the arrangement of Figure 1, Figure 7 illustrates one example of the application of the invention to a pilot wire protective system, and Figures 8-13 show modifications of the arrangement of Figure 7.

In the arrangement of Figure 1 the overload relay A has its movable contact member $A^1$ in the form of a change-over switch, the arm of this switch being connected to the secondary winding $B^1$ of an iron core ring type transformer B through which the main protected conductor C passes. A circuit-breaker $C^1$ in the main conductor C is controlled by a tripping coil $C^2$, which is connected to one of the fixed contacts $A^2$ of the change-over switch, the operating coil of the relay A being connected to the other fixed contact $A^3$. Normally the change-over switch is in the position shown, in which the transformer secondary $B^2$ is directly connected through the contact $A^3$ to the relay coil, but when an overload occurs the relay is energized to transfer the switch arm $A^1$ over to the other contact $A^2$, when the secondary is directly connected to the tripping coil $C^2$, the relay connections being broken. Thus normally the only load on the transformer B is that due to the relay coil A, whilst when the relay operates the full power of the transformer is available to operate the tripping coil.

A convenient construction of relay having inverse time characteristics is illustrated diagrammatically in Figure 2. In this construction the relay coils D are linked with a magnetic core $D^1$ having an air gap $D^2$ within which a magnetic disc E rotates. The disc E is mounted on a spindle $E^1$ carrying a pulley $E^2$ on which is wound a rope $E^3$ carrying a weight $E^4$. Thus when the current passing through the relay coils D exceeds a predetermined setting (dependent upon the weight $E^4$) the disc E will rotate and will cause the rope to be wound in on the pulley. The rope $E^3$ passes through a hole $F^1$ in a pivoted contact-making arm F, and after a predetermined time interval has elapsed the weight $E^4$ lifts the arm F against the action of a spring $F^2$. This transfers the movable contact G carried by the arm F from the fixed contact $G^1$ connected to the relay coils D to the fixed contact $G^2$ connected to the tripping coil H, the movable contact G being connected to the transformer secondary $H^1$. When the relay contacts operate a projection $F^3$ carried by the arm F moves past the end of a spring $F^4$ which is released and then serves to hold the contact arm in the new position. For resetting purposes a hand-knob $F^5$ is provided by means of which the spring $F^4$ can be pulled back to allow the arm F to return to its normal position.

It will usually be desirable to arrange the contacts in such a manner that the circuit to the tripping coil H is made before the relay circuit is broken. This may be effected in various ways and two alternatives are illustrated in Figures 3 and 4 in which the same reference letters as in Figure 2 are used where applicable.

In Figure 3 the contact arm F carries two contacts $G^3$ $G^4$ mounted respectively on flexible strips $G^5$ $G^6$. Thus normally the strip $G^5$ is bent whilst the contact $G^3$ engages with the fixed contact $G^1$. During the first part of the movement of the arm F the strip $G^5$ straightens out but maintains contact between $G^3$ and $G^1$ until after the contact $G^4$ has been moved into engagement with the fixed contact $G^2$. The latter portion of the movement breaks the connection between $G^3$ and $G^1$ and presses the contact $G^4$ firmly against the fixed contact $G^2$ bending the strip $G^6$.

In the arrangement of Figure 4 the movable contact $G^7$ carried by the arm F makes sliding engagement over the fixed segmental contacts $G^8$ $G^9$, which are so disposed that the gap between them is narrower than the width of the contact $G^7$ and can therefore be bridged by that contact.

Figure 5 illustrates the application of the invention to overload protection for a three-phase system, the secondary circuits only being illustrated for the sake of clearness. In this case each phase has its own protective current transformer the secondary windings J $J^1$ $J^2$ being connected in star. A relay K (or $K^1$ or $K^2$) and a tripping coil L (or $L^1$ or $L^2$) is also provided in each phase, the three coils in each case also being connected in star with the three star-points connected together. The tripping coils are preferably so arranged that each is operative to cut out all three of the protected phases. Each relay has its contact member in the form of a change-over switch arranged in one or other of the manners above described, so that in each phase the transformer secondary J is normally connected to the relay K, but is only connected to the tripping coil L when the relay operates. The gap between the fixed contacts of each relay may be bridged by a non-inductive resistance M or a condenser $M^1$, if desired, to lessen possible sparking, and it will be understood that similar arrangements may be made in the previously described systems.

In each of the preceding arrangements the tripping coil is normally open-circuited and the relay coil is open-circuited after operation, but it will be understood that these coils may, if desired, be short-circuited instead of open-circuited. Such an arrangement is illustrated by way of example in Figure 6, this arrangement being in other respects similar to that of Figure 1. In this case the two sides of the secondary $B^3$ of the protective current transformer $B^2$ are connected to the two fixed contacts $A^4$ $A^5$ of the relay and also to the tripping coil $C^3$ and to the relay coil $A^6$ respectively. The other sides of the tripping coil $C^3$ and the relay coil $A^6$ are connected together and to the movable contact arm $A^7$ of the relay. Thus normally the contact arm $A^7$ serves to short-circuit the tripping coil $C^3$ and the transformer secondary $B^3$ is directly connected to the relay coil $A^6$. After the relay has operated the contact arm short-circuits the relay coil $A^6$ and connects the transformer secondary $B^3$ directly to the tripping coil $C^3$.

As has already been mentioned the invention is also applicable to pilot wire protective systems, and Figure 7 shows by way of example one arrangement of balanced protective system for a three-phase feeder. In this arrangement the protected feeder N is provided at each end with three protective current transformers $N^1$, one for each phase, whose secondary windings $N^2$ are connected in series with one another (as for example in reverse delta as shown), and a two-core pilot circuit O $O^1$ is employed. The transformer secondaries $N^2$ are connected on one side to the pilot core O and on the other side to a contact arm $P^1$ of a protective relay P. This contact arm $P^1$ cooperates with two fixed contacts $P^2$ $P^3$ connected respectively to the relay coil P and to a tripping coil Q controlling a circuit-breaker $Q^1$ in the protected feeder N. The other sides of the relay coil P and the tripping coil Q are connected together and to the pilot core $O^1$, and the relay is provided with a second set of contacts $P^4$ which close when the relay operates and short-circuit the two pilot cores O $O^1$. A relatively insensitive diverter relay R connected across the two pilot cores O $O^1$ is provided for each protective relay P and acts to vary the sensitiveness of the protective relay, as for example by introducing a resistance $R^1$ in shunt with the relay coil. The primary function of such a diverter relay is to ensure that the protective devices will not operate in the event of the passage of heavy straight through currents in the feeder, whilst leaving the sensitiveness of the protective arrangement unimpaired in the event of faults.

Thus normally the tripping coil Q is open-circuited and the transformer secondaries $N^2$ are connected in series with the relay P and the pilot cores O $O^1$ in the usual manner for a balanced protective system. When the relay P operates, however, the contact arm $P^1$ moves over to cut out the relay coil P and to bring the tripping coil Q into circuit, whilst the second set of contacts $P^4$ short-circuits the two pilot cores O $O^1$. This completes a localized circuit from the transformer secondaries $N^2$ directly to the tripping coil Q.

Figures 8–11 illustrate modifications of the system shown in Figure 7 and in each case one end only of the secondary circuits is shown, the remainder of the system being identical with that shown in Figure 7. In all four arrangements (as in the arrangement of Figure 7) the three series-connected transformer secondaries $N^2$ are connected on one side to one core O of a two-core pilot circuit O $O^1$, and the arrangements only differ from one another in respect of the connections to the relay coil P and the tripping coil Q and the circuits controlled by the relay contacts.

In the arrangement of Figure 8 the relay P has a single contact arm $P^5$, which normally acts to short-circuit the tripping coil Q and to connect the secondaries $N^2$ to the relay coil P and to the pilot cores O $O^1$. After operation of the relay, the pilot cores and the relay coil are short-circuited and the tripping coil Q is brought into a localized circuit with the secondaries $N^2$.

Figure 9:
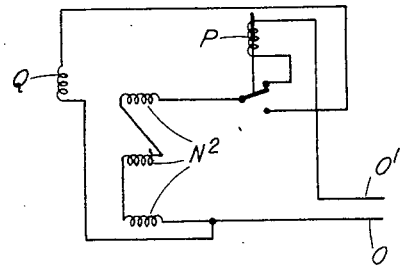

The arrangement of Figure 9 differs from that of Figure 8 in that the tripping coil Q is normally open-circuited instead of short-circuited, whilst after operation the relay coil P and the pilot cores O $O^1$ are open-circuited.

Figure 10:
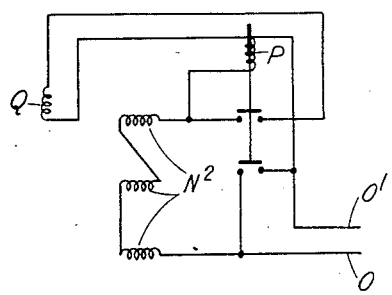

In the arrangement of Figure 10 the tripping coil Q is again normally open-circuited, whilst after operation the pilot cores O $O^1$ are short-circuited, the relay coil P being left in circuit in parallel with the tripping coil Q.

Figure 11:
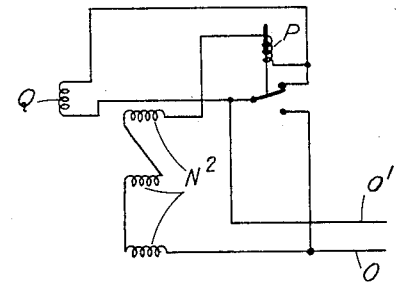

Figure 11 shows another modification in which the tripping coil Q is normally short-circuited, whilst after operation the pilot cores O $O^1$ are short-circuited and the relay coil P is left in circuit in series with the tripping coil Q.

Figure 12:
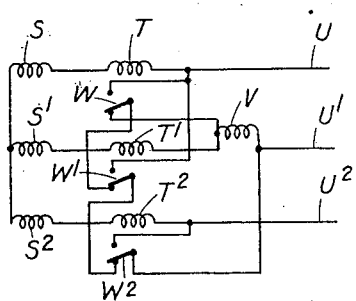
Figure 13:
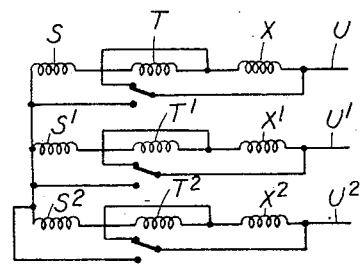

Figures 12 and 13 show two further modifications of the arrangement of Figure 7, in which a three-core pilot system is used. These figures show only one end of the secondary circuits. In each case three current transformers are provided at each end of the protected feeder, one in each phase, and their secondaries S $S^1$ $S^2$ are connected together in star on one side, whilst on the other side they are each connected through a relay coil T (or $T^1$ or $T^2$) with one of the pilot cores U (or $U^1$ or $U^2$).

In the arrangement of Figure 12 a single tripping coil V is used and is normally short-circuited by a circuit containing three sets of contacts W $W^1$ $W^2$, one associated with each of the three relays T $T^1$ $T^2$, this circuit being connected to one of the pilot cores $U^1$. When any one of the three relays operates, its contacts W $W^1$ $W^2$ are changed over, so as to short-circuit the pilot core $S^1$ with one of the other pilot cores U or $U^2$ and to bring the tripping coil V into the circuit (thus localized) containing two of the transformer secondaries S $S^1$ or $S^1 S^2$ with (or without) the corresponding two relay coils T $T^1$ or $T^1$ $T^2$.

The arrangement of Figure 13 differs from that of Figure 12 in that three tripping coils X $X^1$ $X^2$ are employed, these coils being connected one in each phase in series with the transformer secondary S (or $S^1$ or $S^2$) and the relay coil T (or $T^1$ or $T^2$) which are arranged as before. In the normal condition each tripping coil is short-circuited by the contacts of the relay in the same phase. When one of the relays (say T) operates, however, the tripping coil X is brought into circuit with the transformer secondary S and a connection is made between the pilot core U and the star-point so as to localize this circuit. It will be understood that any one of the tripping coils when energized will trip a circuit-breaker in all three phases of the protected feeder.

These two arrangements can be modified in various ways, so that in the normal condition the transformer secondaries are in circuit with the relays and the pilot cores, whilst when one or other of the relays operates, the tripping coil or one or more of the tripping coils is brought into a localized circuit containing one or more of the secondaries.

It will be understood that a diverter relay may be provided for each of the protective relays in the arrangements of Figures 8–13 in the manner already described with reference to Figure 7.

What I claim as my invention and desire to secure by Letters Patent is:—

1. Protective apparatus for an A. C. circuit, including in combination a protective current transformer connected in the protected circuit, a relay normally in circuit with the secondary winding of the transformer, a tripping coil, a circuit-breaker in the protected circuit operated by the tripping coil, and means whereby the operation of the relay acts to cut the relay out of circuit and to bring the tripping coil into circuit with the secondary winding whereby the circuit-breaker is operated.

2. Protective apparatus for an A. C. circuit, including in combination a protective current transformer connected in the protected circuit, a relay having a time-delay action and normally in circuit with the secondary winding of the transformer, a tripping coil, a circuit-breaker in the protected circuit operated by the tripping coil, and means whereby the operation of the relay acts to cut the relay out of circuit and to bring the tripping coil into circuit with the secondary winding whereby the circuit-breaker is operated.

3. Protective apparatus for an A. C. circuit, including in combination a protective current transformer connected in the protected circuit, a tripping coil, a circuit-breaker in the protected circuit operated by the tripping coil, and a relay comprising an operating coil normally connected in circuit with the transformer secondary winding, time-delay mechanism, and a contact member acting as a change-over switch to connect the tripping coil in circuit with the secondary winding and to cut out the operating coil when the relay operates.

4. Protective apparatus for an A. C. circuit, including in combination protective current transformers connected in the protected circuit at its ends, pilot wires connecting the secondary windings of such transformers, at least one relay normally connected in the pilot circuit at each end, a tripping coil associated with the pilot circuit at each end, a circuit-breaker in the protected circuit operated by each tripping coil, and means whereby the operation of a relay causes a modification to be made in the pilot circuit and also causes a tripping coil to operate its circuit-breaker.

5. Protective apparatus for an A. C. circuit, including in combination protective current transformers connected in the protected circuit at its ends, pilot wires connecting the secondary windings of such transformers, at least one relay normally connected in the pilot circuit at each end, a tripping coil associated with the pilot circuit at each end, a circuit-breaker in the protected circuit operated by each tripping coil, and means whereby the operation of a relay acts to cut the relay out of circuit, to modify the pilot circuit and to bring the tripping coil into circuit with at least one of the adjacent transformer secondary windings.

6. Protective apparatus for an A. C. circuit, including in combination protective current transformers connected in the protected circuit at its ends, pilot wires connecting the secondary windings of such transformers, at least one relay normally connected in the pilot circuit at each end, a tripping coil associated with the pilot circuit at each end, a circuit-breaker in the protected circuit operated by each tripping coil, and means whereby the operation of a relay acts to bring the tripping coil into circuit with at least one transformer secondary winding and to effect such modification of the pilot circuit as to localize the circuit containing the tripping coil and the secondary winding.

7. Protective apparatus for an A. C. circuit, including in combination protective current transformers connected in the protected circuit at its ends, pilot wires connecting the secondary windings of such transformers, at least one relay normally connected in the pilot circuit at each end, at least one normally short-circuited tripping coil at each end of the pilot circuit, circuit-breakers in the protected circuit operated by the tripping coils, and means whereby the operation of a relay causes the pilot circuit to be short-circuited, at least one tripping coil to be brought into circuit with a transformer secondary winding and the relay circuit to be broken.

8. Protective apparatus for an A. C. circuit, including in combination a group of protective current transformers at each end of the protected circuit having their secondary windings in series with one another, a two-core pilot circuit connecting such secondary windings, a normally short-circuited tripping coil at each end of the pilot circuit, a circuit-breaker in the protected circuit controlled by each tripping coil, and a relay at each end of the pilot circuit acting when operated to short-circuit the two cores of the pilot circuit and to bring the tripping coil into circuit with the transformer secondary windings.

9. Protective apparatus for an A. C. circuit, including in combination protective current transformers connected in the protected circuit at its ends, pilot wires connecting the secondary windings of such transformers, at least one tripping coil associated with the pilot circuit at each end, circuit-breakers in the protected circuit operated by the tripping coils, and at least one relay at each end comprising time delay mechanism, an operating coil normally connected in series with the pilot circuit and a contact member acting when the relay operates to bring a tripping coil into circuit with a transformer secondary winding and to effect such modification of the pilot circuit as to localize the circuit containing the tripping coil and the transformer secondary.

In testimony whereof I have signed my name to this specification.

REGINALD WILLIAM BILES.